(12) United States Patent
Chen et al.

(10) Patent No.: US 8,625,276 B2
(45) Date of Patent: Jan. 7, 2014

(54) ELECTRONIC DEVICE WITH AIRFLOW GUIDING DUCT

(75) Inventors: Yun-Lung Chen, New Taipei (TW); Liang-Chin Wang, New Taipei (TW); Jian Hu, Shenzhen (CN); Yu-Ming Xiao, Shenzhen (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 276 days.

(21) Appl. No.: 13/219,858

(22) Filed: Aug. 29, 2011

(65) Prior Publication Data

US 2012/0275113 A1 Nov. 1, 2012

(30) Foreign Application Priority Data

Apr. 28, 2011 (CN) .......................... 2011 1 0107302

(51) Int. Cl.
*H05K 7/20* (2006.01)

(52) U.S. Cl.
USPC ........................ 361/694; 361/695; 361/679.48

(58) Field of Classification Search
USPC ..................... 361/694, 695, 679.48
See application file for complete search history.

(56) References Cited

U.S. PATENT DOCUMENTS

| | | | | | |
|---|---|---|---|---|---|
| 6,040,981 | A | * | 3/2000 | Schmitt et al. | 361/695 |
| 6,215,664 | B1 | * | 4/2001 | Hernandez et al. | 361/725 |
| 6,313,989 | B1 | * | 11/2001 | Kuang | 252/62.9 PZ |
| 6,317,320 | B1 | * | 11/2001 | Cosley et al. | 361/695 |
| 7,054,155 | B1 | * | 5/2006 | Mease et al. | 361/695 |
| 7,403,390 | B2 | * | 7/2008 | Franz et al. | 361/695 |
| 7,580,259 | B2 | * | 8/2009 | Hsiao | 361/695 |
| 7,821,788 | B2 | * | 10/2010 | Hsiao | 361/695 |
| 7,916,471 | B2 | * | 3/2011 | Miyamoto et al. | 361/679.5 |
| 8,451,605 | B2 | * | 5/2013 | Chen | 361/695 |
| 2003/0188847 | A1 | * | 10/2003 | Lai et al. | 165/80.2 |
| 2004/0004812 | A1 | * | 1/2004 | Curlee et al. | 361/687 |
| 2004/0121719 | A1 | * | 6/2004 | Robison et al. | 454/143 |
| 2005/0185373 | A1 | * | 8/2005 | Chen et al. | 361/685 |
| 2006/0256522 | A1 | * | 11/2006 | Wei et al. | 361/695 |
| 2007/0285882 | A1 | * | 12/2007 | Chen | 361/683 |
| 2008/0041561 | A1 | * | 2/2008 | Zhou et al. | 165/80.3 |
| 2008/0080135 | A1 | * | 4/2008 | Franz et al. | 361/695 |
| 2008/0101021 | A1 | * | 5/2008 | Sanchez et al. | 361/695 |
| 2010/0314080 | A1 | * | 12/2010 | Cao et al. | 165/121 |
| 2011/0067836 | A1 | * | 3/2011 | Tang et al. | 165/67 |
| 2011/0100600 | A1 | * | 5/2011 | Tang et al. | 165/96 |
| 2011/0317362 | A1 | * | 12/2011 | Chen | 361/695 |

* cited by examiner

*Primary Examiner* — Anatoly Vortman
(74) *Attorney, Agent, or Firm* — Altis Law Group, Inc.

(57) ABSTRACT

An electronic device includes an enclosure, and an airflow guiding duct. The enclosure includes a bottom panel. The airflow guiding duct is pivotably mounted to the enclosure. The airflow guiding duct includes a positioning portion. The bottom panel defines a sliding slot. A positioning opening is defined in the bottom panel communicating with the sliding slot. The positioning portion is used for being driven to slide along the sliding slot to move into the positioning opening when the airflow guiding duct is rotated.

18 Claims, 6 Drawing Sheets

ELECTRONIC DEVICE WITH AIRFLOW GUIDING DUCT

BACKGROUND

1. Technical Field

The disclosure generally relates to electronic devices, especially, to an electronic device with an airflow guiding duct.

2. Description of Related Art

A heat dissipating module is generally mounted on a motherboard of an electronic device, such as a computer, for dissipating heat generated by electronic components in the electronic device. Heat generated by the electronic components becomes greater due to faster speeds of the computers. Present heat dissipating modules cannot satisfy the requirements of current computer systems. An airflow guiding duct is usually mounted above the heat dissipating module on the motherboard, for guiding airflow, increasing effectiveness of heat dissipation. Conventionally, the airflow guiding duct is mounted in the electronic device via fasteners, such as screws and bolts. This method involves many fasteners and adds cost of labor in manufacturing.

Thus, there is room for improvement within the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
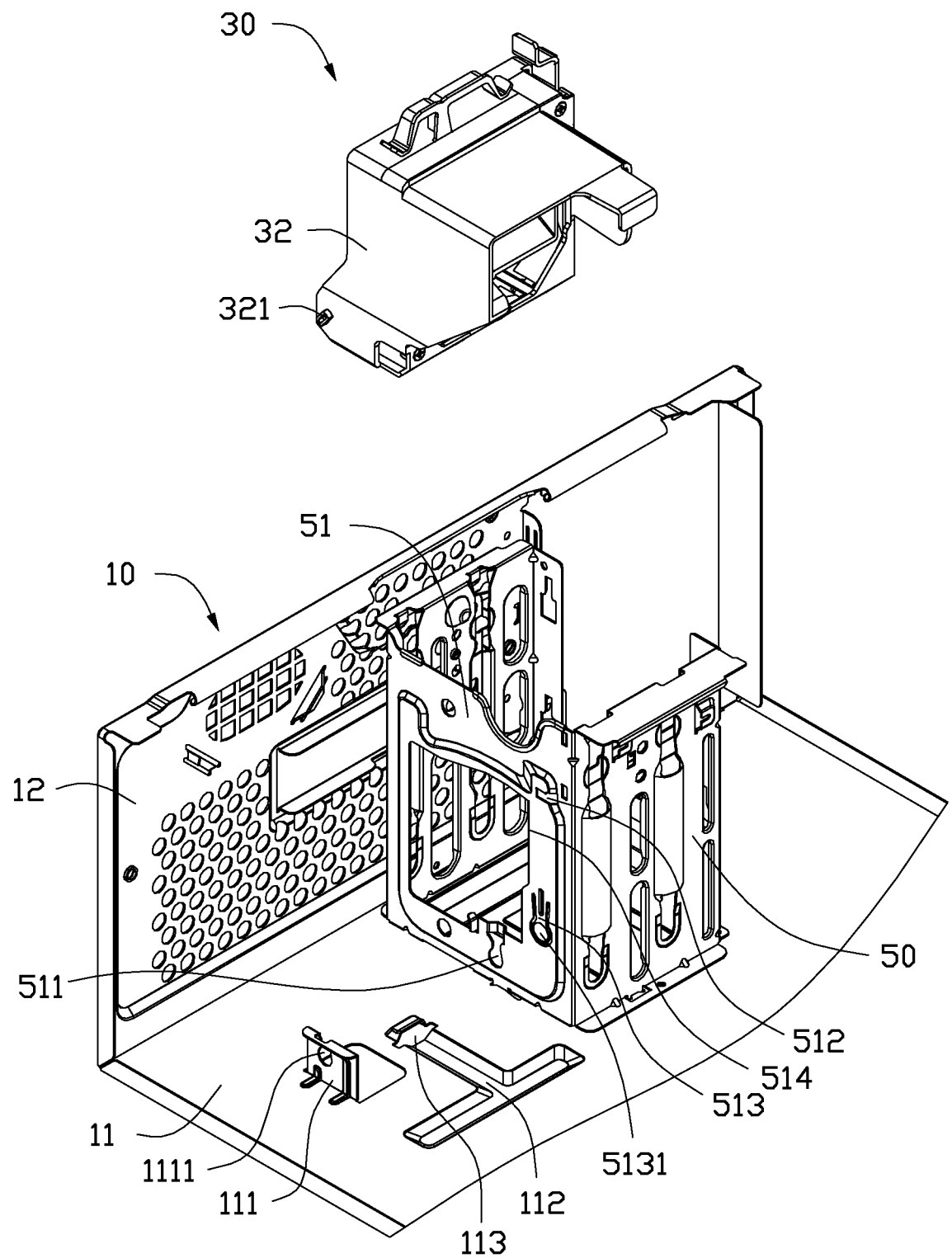
FIG. 1 is an exploded, isometric view of an embodiment of an electronic device.

Referring to FIG. 1, one embodiment of an electronic device is shown. The electronic device includes an enclosure 10, and an airflow guiding duct 30 mounted on the enclosure 10.

The enclosure 10 includes a bottom panel 11, a side panel 12 perpendicularly extending from the bottom panel 11, and a drive bracket 50 mounted on the bottom panel 11. The bottom panel 11 includes a mounting portion 111. In one embodiment, the mounting portion 111 is located on the bottom panel 11. A first pivoting hole 1111 is defined in the mounting portion 111. The bottom panel 11 defines a sliding slot 112. A positioning opening 113 is defined in the bottom panel 11 and communicates with the sliding slot 112. The drive bracket 50 includes a mounting panel 51 substantially perpendicular to the bottom panel 11. A second pivoting hole 511 is defined in the mounting panel 51. The first and second pivoting holes 1111, 511 both have a wide part and a narrow part. A securing opening 512 is defined in the mounting panel 51. The mounting panel 51 includes an elastic tab 513. A free end of the elastic tab 513 includes positioning protrusion 5131. The mounting panel 51 further includes a resisting edge 514.

Figure 2:
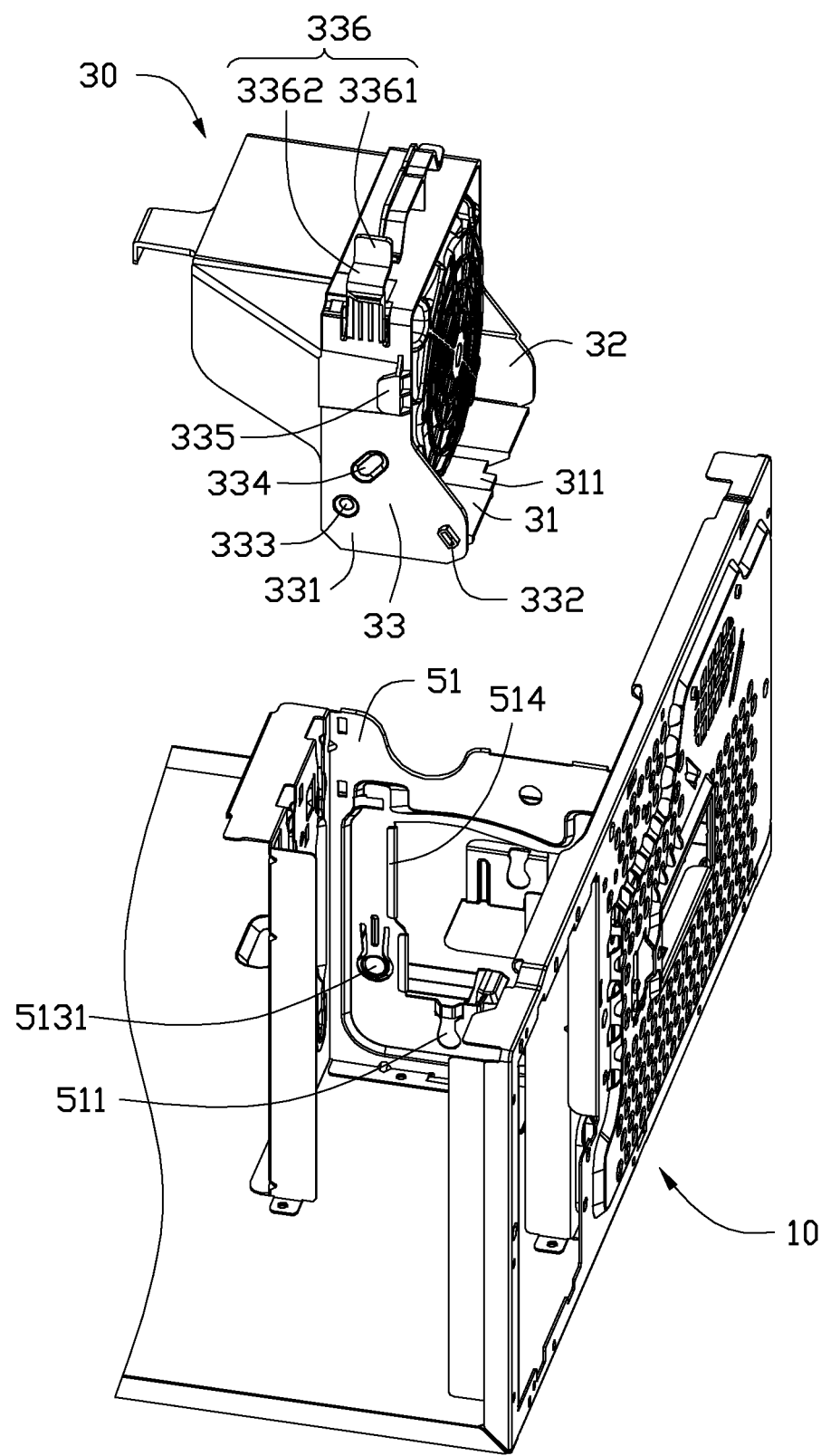
FIG. 2 is similar to FIG. 1, but viewed from another aspect.
Figure 3:
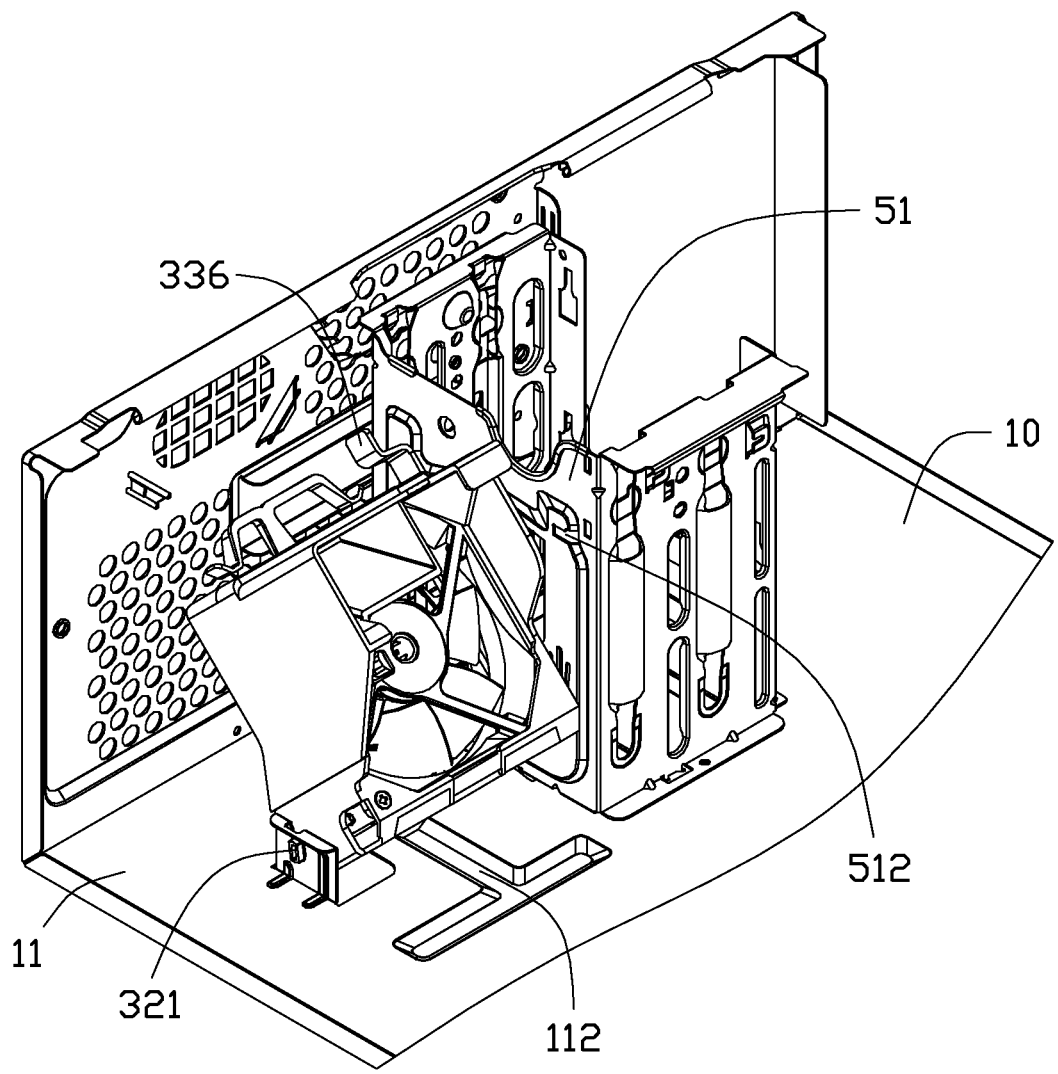
FIG. 3 is a view of pre-assembled electronic device of FIG. 1.
Figure 4:
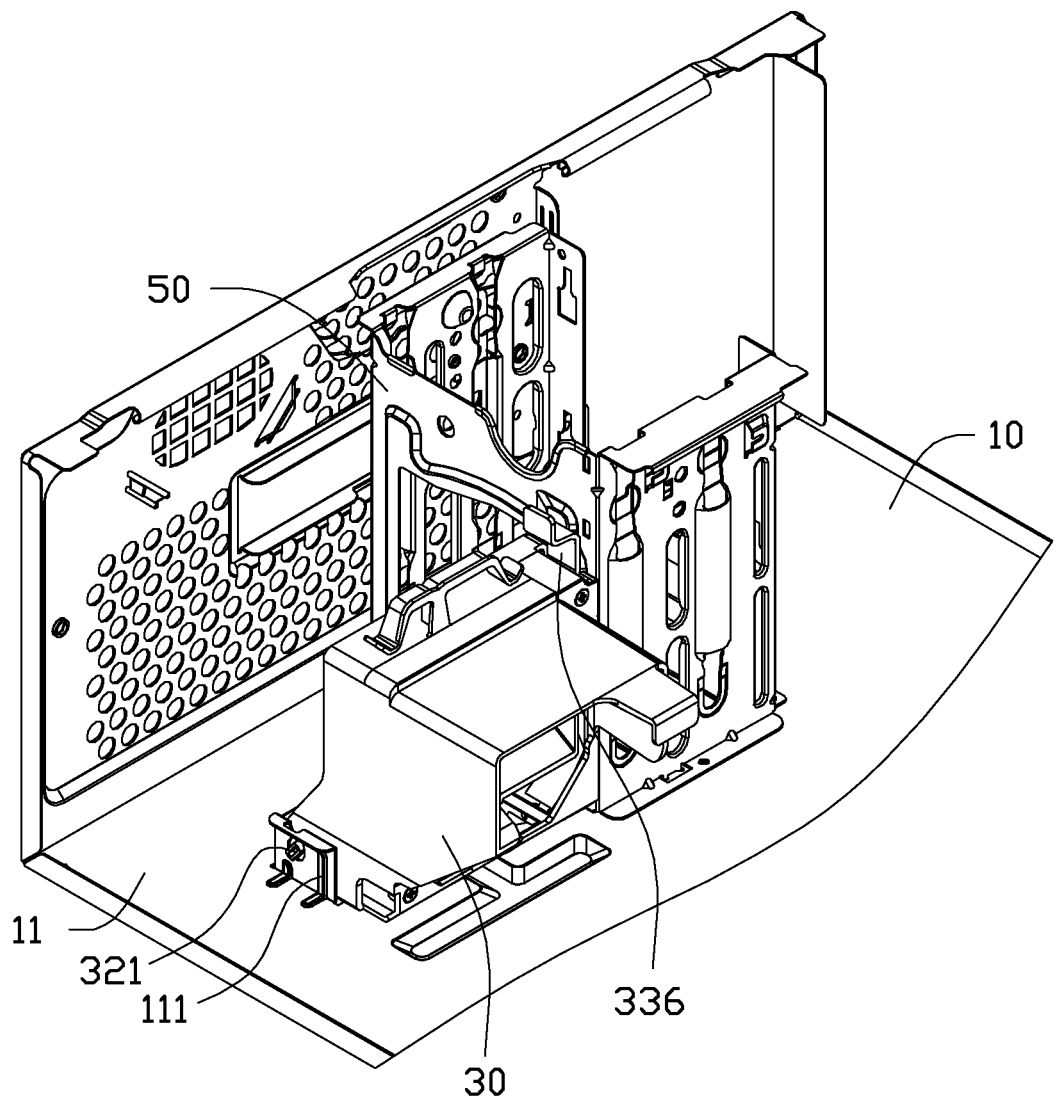
FIG. 4 is a view of assembled electronic device of FIG. 1.
Figure 5:
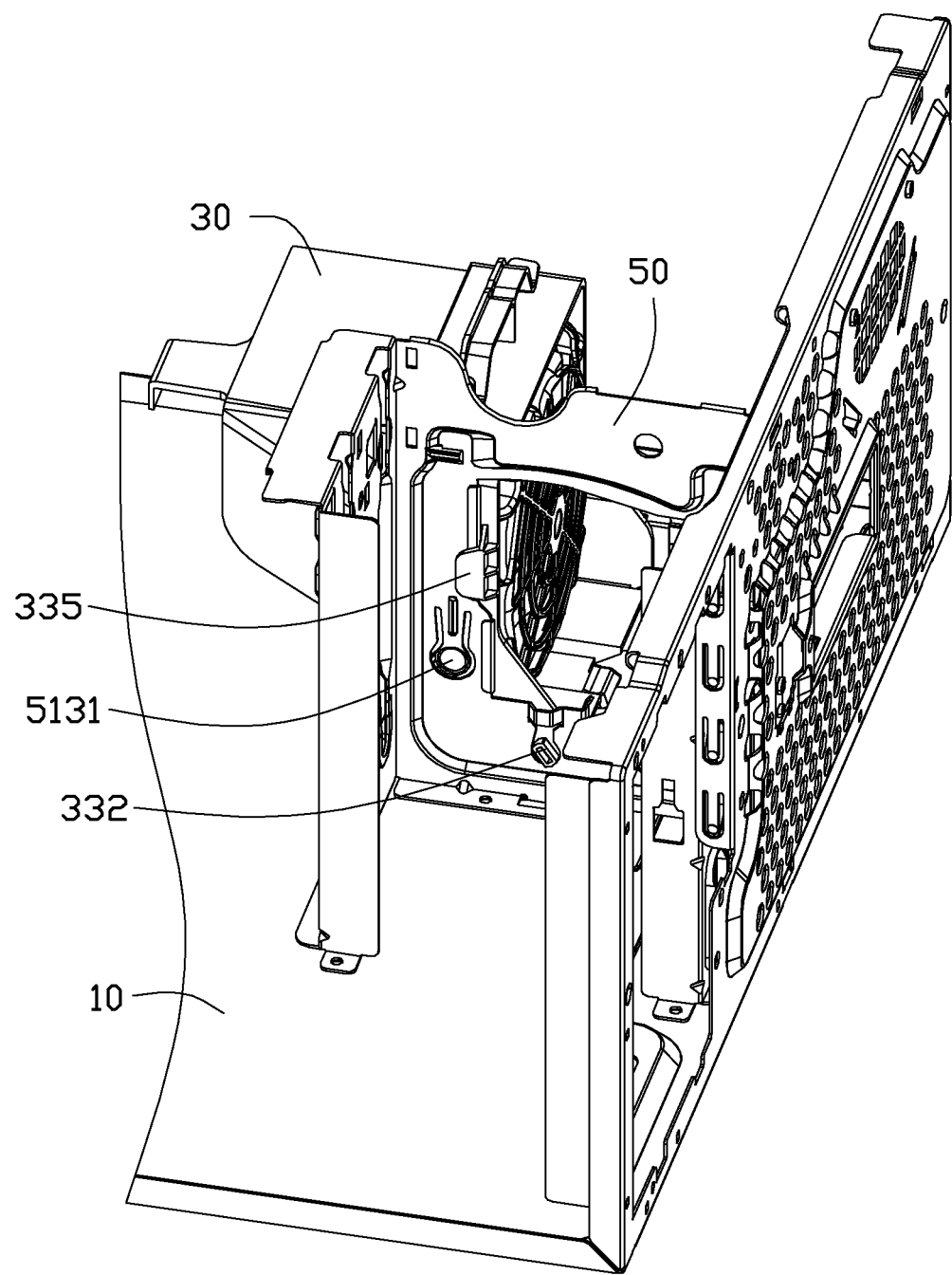
FIG. 5 is similar to FIG. 4, but viewed from another aspect.
Figure 6:
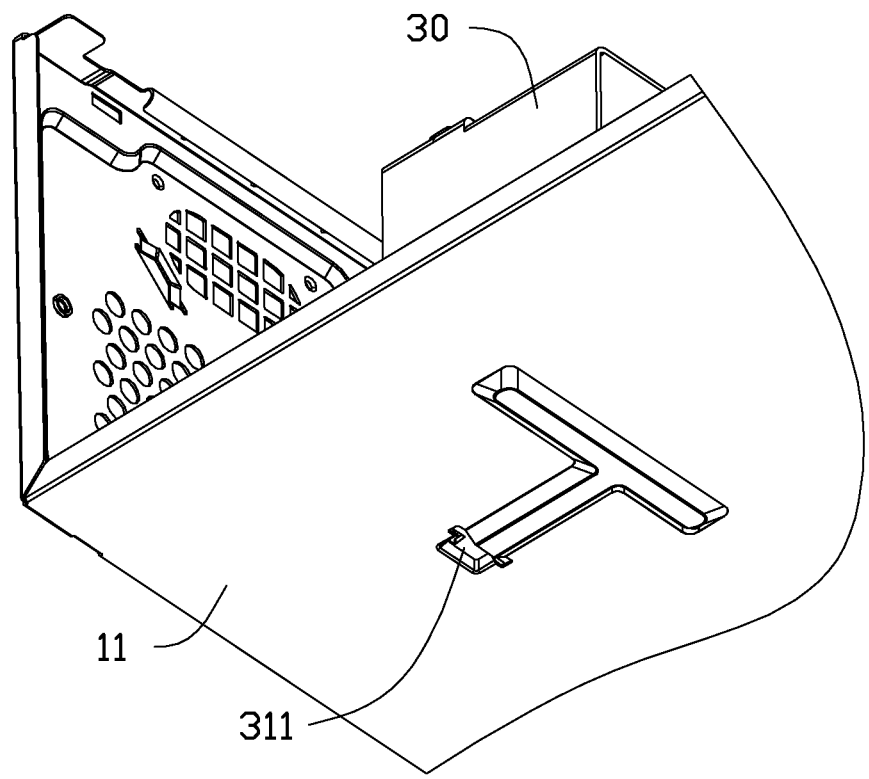
FIG. 6 is similar to FIG. 4, but viewed from another aspect.

Referring to FIGS. 1 and 2, the airflow guiding duct 30 includes a bottom wall 31, a first sidewall 32 perpendicularly extending from the bottom wall 31, and a second sidewall 33 perpendicularly extending from the bottom wall 31. The bottom wall 31 includes a positioning portion 311 corresponding to the positioning opening 113 of the bottom panel 11. The first sidewall 32 includes a first pivot 321 corresponding to the first pivoting hole 1111. The second sidewall 33 includes a wall body 331, and a second pivot 332 extending from the wall body 331 corresponding to the second pivoting hole 511. The first pivot 321 and the second pivot 332 are strip-shaped. The wall body 331 includes a first recess portion 333 and a second recess portion 334. A distance between the first recess portion 333 and the second pivot 332 is substantially equal to a distance between the second recess portion 334 and the second pivot 332. The second sidewall 33 includes a positioning tab 335 corresponding to the resisting edge 514. The positioning tab 335 is substantially parallel to the wall body 331. The second sidewall 33 further includes a securing portion 336 extending from the wall body 331. The securing portion 336 includes securing protrusion 3362 corresponding to the securing opening 512 and a handle portion 3361 extending from the securing protrusion 3362. The handle portion 3361 is capable of being pressed to drive the securing protrusion 3362 to move.

Referring to FIGS. 1 to 6, in assembly, the first pivot 321 and the second pivot 332 of the airflow guiding duct 30 are placed in and moved from the narrower parts of the first and second pivoting holes 1111 and 511 to the wider parts respectively, thereby mounting the airflow guiding duct 30 to the enclosure 10 pivotably. The positioning portion 311 of the airflow guiding duct is placed in the sliding slot 112. The airflow guiding duct 30 is rotated towards the bottom panel 11 about a pivoting axis substantially parallel to the bottom panel 11. The positioning portion 311 moves along the sliding slot 112 into the positioning opening 113 to prevent the airflow guiding duct 30 from moving in a direction substantially perpendicular to the bottom panel 11. The positioning protrusion 5131 of the elastic tab 513 of the mounting panel 51 moves into the first recess portion 333. The positioning tab 335 of the airflow guiding duct 30 moves to the resisting edge 514 of the mounting panel 51. When the airflow guiding duct 30 is rotated more, the positioning protrusion 5131 of the elastic tab 513 moves to the second recess portion 334 until the positioning protrusion 5131 is disposed in the second recess portion 334. At this time, the positioning portion 311 is disposed in the positioning opening 113. The resisting edge 514 is disposed between the positioning tab 335 and the wall body 331. The securing protrusion 3361 of the airflow guiding duct 30 engages the securing opening 512.

The airflow guiding duct 30 is in a first position when the positioning protrusion 5131 is disposed in the first recess portion 333. The airflow guiding duct 30 is in a second position when the positioning protrusion 5131 is disposed in the second recess portion 334.

In disassembly, the handle portion 3361 is pressed to drive the securing protrusion 3361 to disengage from the securing opening 512. The airflow guiding duct 30 is rotated away from the bottom panel 11 until the airflow guiding duct 30 can be removed from the enclosure 10.

It is to be understood, however, that even though numerous characteristics and advantages have been set forth in the foregoing description of embodiments, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. An electronic device, comprising:
   an enclosure, the enclosure comprising a bottom panel, the bottom panel defining a sliding slot, a positioning opening defined in the bottom panel communicating with the sliding slot; and
   an airflow guiding duct, the airflow guiding duct pivotably mounted to the enclosure, the airflow guiding duct comprising a positioning portion, the positioning portion adapted to move along the sliding slot to engage with the positioning opening to prevent the airflow guiding duct from moving in a direction substantially perpendicular to the bottom panel when the airflow guiding duct rotates about a pivoting axis substantially parallel to the bottom panel.

2. The electronic device of claim 1, wherein the airflow guiding duct comprises a first recess portion and a second recess portion; the enclosure further comprises a mounting panel; the mounting panel comprises an elastic tab; and the elastic tab is adapted to be disposed in the first recess portion to enable the airflow guiding duct to be in a first position or be disposed in the second recess portion to enable the airflow guiding duct to be in a second position.

3. The electronic device of claim 2, wherein a free end of the elastic tab comprises a positioning protrusion corresponding to the first recess portion and the second recess portion.

4. The electronic device of claim 1, wherein the airflow guiding duct comprises a bottom wall, a first sidewall extending from the bottom wall, and a second sidewall extending from the bottom wall; the enclosure further comprises a mounting panel perpendicularly extending from the bottom panel, the second sidewall adjacent to the mounting panel; the second sidewall comprises a wall body and a positioning tab extending from the wall body; the mounting panel comprises a resisting edge; and the resisting edge is adapted to be disposed between the positioning tab and the wall body when the positioning portion is disposed in the positioning opening.

5. The electronic device of claim 4, wherein the positioning tab is substantially parallel to the wall body.

6. The electronic device of claim 1, wherein the airflow guiding duct comprises a bottom wall, a first sidewall extending from the bottom wall, and a second sidewall extending from the bottom wall; the enclosure further comprises a mounting panel perpendicularly extending from the bottom panel; the second sidewall adjacent to the mounting panel; the second sidewall comprises a securing portion; a securing opening is defined in the mounting panel; and the securing portion is adapted to engage the securing opening when the airflow guiding duct is in the second position.

7. The electronic device of claim 6, wherein the securing portion comprises a securing protrusion for engaging the securing opening and a handle portion extending from the securing protrusion, the handle portion adapted to be pressed to drive the securing protrusion to disengage the securing opening.

8. The electronic device of claim 1, wherein the enclosure further comprises a mounting portion extending from the bottom panel and a mounting panel mounted on the bottom panel, the mounting portion and the mounting panel substantially perpendicular to the bottom panel; a first pivoting hole is defined in the mounting portion; a second pivoting hole is defined in the mounting panel; and the airflow guiding duct comprises a first pivot and second pivot corresponding to the first pivoting hole and the second pivoting hole.

9. The electronic device of claim 8, wherein the first pivot is strip-shaped, the first pivoting hole defines a narrower part and a wider part connected to the narrower part, and the first pivot is adapted to be mounted in the wider part via the narrower part.

10. An electronic device, comprising:
    an enclosure, the enclosure comprising a bottom panel, a mounting portion extending from the bottom panel, and a mounting panel mounted on the bottom panel, the mounting portion and the mounting panel substantially perpendicular to the bottom panel; and
    an airflow guiding duct, the airflow guiding duct pivotably mounted between the mounting portion and the mounting panel, the airflow guiding duct being rotatable from a first position to a second position;
    wherein the airflow guiding duct comprises a first recess portion and a second recess portion; the mounting panel comprises an elastic tab; the elastic tab is adapted to be disposed in the first recess portion to enable the airflow guiding duct to be in the first position or be disposed in the second recess portion to enable the airflow guiding duct to be in the second position.

11. The electronic device of claim 10, wherein a free end of the elastic tab comprises a positioning protrusion corresponding to the first recess portion and the second recess portion.

12. The electronic device of claim 10, wherein the airflow guiding duct comprises a bottom wall, a first sidewall extending from the bottom wall, and a second sidewall extending from the bottom wall, the bottom wall comprises a positioning portion; the second sidewall adjacent to the mounting panel; the second sidewall comprises a wall body and a positioning tab extending from the wall body; the mounting panel comprises a resisting edge; the bottom panel defines a sliding slot; a positioning opening is defined in the bottom panel communicating with the sliding slot; the positioning portion is adapted to move along the sliding slot to engage with the positioning opening to prevent the airflow guiding duct from moving in a direction substantially perpendicular to the bottom panel when the airflow guiding duct rotates about a pivoting axis substantially parallel to the bottom panel; and the resisting edge is adapted to be disposed between the positioning tab and the wall body when the positioning portion is disposed in the positioning opening.

13. The electronic device of claim 12, wherein the positioning tab is substantially parallel to the wall body.

14. The electronic device of claim 10, wherein the airflow guiding duct comprises a bottom wall, a first sidewall extending from the bottom wall, and a second sidewall extending from the bottom wall, the second sidewall adjacent to the mounting panel; the second sidewall comprises a securing portion; a securing opening is defined in the mounting panel; and the securing portion is adapted to engage the securing opening when the airflow guiding duct is in the second position.

15. The electronic device of claim 14, wherein the securing portion comprises a securing protrusion for engaging the securing opening and a handle portion extending from the securing protrusion, the handle portion adapted to be pressed to drive the securing protrusion to disengage the securing opening.

16. The electronic device of claim 10, wherein a first pivoting hole is defined in the mounting portion; a second pivoting hole is defined in the mounting panel; and the airflow guiding duct comprises a first pivot and second pivot corresponding to the first pivoting hole and the second pivoting hole.

17. The electronic device of claim 16, wherein the first pivot is strip-shaped, the first pivoting hole defines a narrower part and a wider part connected to the narrower part, and the first pivot is adapted to be mounted in the wider part via the narrower part.

18. The electronic device of claim 12, wherein the bottom panel defines a sliding slot, a positioning opening defined in the bottom panel communicating with the sliding slot, the positioning portion adapted to be driven to slide along the sliding slot to move into the positioning opening when the airflow guiding duct is rotated.

* * * * *